United States Patent [19]

Henry

[11] E Re. 30,357

[45] Reissued Aug. 5, 1980

[54] DEVICE FOR GRINDING A CABACHON

[75] Inventor: Henry L. Henry, Yucca Valley, Calif.

[73] Assignee: Geode Industries, Inc., New London, Iowa

[21] Appl. No.: 952,571

[22] Filed: Oct. 18, 1978

Related U.S. Patent Documents

Reissue of:

[64] Patent No.: 4,010,575
Issued: Mar. 8, 1977
Appl. No.: 578,924
Filed: May 19, 1975

[51] Int. Cl.[2] ..... B24B 11/00
[52] U.S. Cl. ..... 51/229; 51/234
[58] Field of Search ..... 51/96, 124 B, 124 L, 51/229, 234

[56] References Cited

U.S. PATENT DOCUMENTS

| | | | |
|---|---|---|---|
| 1,314,785 | 9/1919 | Boener | 51/229 |
| 1,415,118 | 5/1922 | Ries | 51/229 |
| 2,212,179 | 8/1940 | Martin | 51/96 |
| 2,332,510 | 10/1943 | Franzen | 51/96 UX |
| 2,982,058 | 5/1961 | Maitenaz | 51/124 |
| 3,335,527 | 8/1967 | Sabine | 51/96 |
| 3,468,067 | 9/1969 | Larson | 51/96 |
| 3,849,945 | 11/1974 | Lindzy | 51/229 |

*Primary Examiner*—Harold D. Whitehead
*Attorney, Agent, or Firm*—Haven E. Simmons; James C. Nemmers

[57] ABSTRACT

A dop stick with an oval cabachon adhesively mounted thereon for application to a grinding stone has two axes of rotation, one axis to determine the longitudinal curvature of the face of the cabachon, the other to determine the transverse curvature, and may be moved at random about the two axes of rotation simultaneously without departing from accurate positioning of the cabachon for correctly grinding the cabachon face.

4 Claims, 5 Drawing Figures

DEVICE FOR GRINDING A CABACHON

Matter enclosed in heavy brackets [ ] appears in the original patent but forms no part of this reissue specification; matter printed in italics indicates the additions made by reissue.

BACKGROUND OF THE INVENTION

The present invention is a lapidary device for use by amateurs and professionals to facilitate the grinding of a convex face on an elongated rounded cabachon to both a predetermined radius of longitudinal curvature and a predetermined shorter radius of transverse curvature. A cabachon or "cab" is a thin slice of rock which is temporarily mounted on the end of a cylindrical dowel known as a "dop stick" for shaping the cabachon by a grinding wheel. The specific function of the device is to facilitate manipulations for grinding a convex face on a cabachon of generally oval plan configuration.

Lapidary devices for grinding cabachons are disclosed in the Geizentanner U.S. Pat. No. 3,279,127, the Reed U.S. Pat. No. 3,844,070, and the Lindzy Pat. No. 3,849,945.

The Geizentanner patent discloses a power-actuated grinding apparatus for simultaneously grinding the faces of a plurality of round cabachons to spherical convex curvature. The apparatus is not capable of grinding a cabachon of oval plan configuration to produce a convex face of predetermined longitudinal and transverse curvature.

The device disclosed in the Reed patent is designed to grind a rounded peripheral edge on a cabachon and is capable of forming the cabachon to a predetermined oval plan configuration. No method is disclosed in the patent for forming the face of the cabachon and apparently the finished cabachon has a flat face.

The device disclosed in the Lindzy patent is capable of forming a cabachon with a convex face of the configuration of a fragment of a cylinder and also is capable of forming a convex face of spherical curvature. The device is not capable of forming an oval convex face of predetermined longitudinal and transverse curvature.

SUMMARY OF THE INVENTION

The broad object of the invention is to provide a device to facilitate the grinding of a cabachon of oval plan shape to produce a convex face surface of accurately predetermined longitudinal and transverse curvature. Another object is to provide such a device that is of simple construction and that does not require any specialized skill on the part of the operator. A more specific object of the invention is to provide such a device that makes it possible for the operator to shift the grinding action at random over the whole face area of an oval cabachon with assurance that the grinding action conforms to the desired double curvature of the convex face.

To achieve these objects, a cabachon of oval plan configuration is placed on the outer end of a dop stick that is mounted on a support for freedom to pivot independently about two axes of rotation. The first of the two axes of rotation is in the same plane as the transverse center line of the oval plan configuration of the cabachon and is parallel therewith at a distance from the desired convex face that determines the longitudinal curvature of the convex surface of the finished cabachon. The second axis of rotation, located between the first axis of rotation and the cabachon, is in the plane of the longitudinal center line of the oval plan configuration of the cabachon and is parallel therewith at a distance from the desired convex surface that determines the transverse curvature of the finished cabachon.

In the preferred practice of the invention, the device has a support or base structure which is anchored at an appropriate distance from the working surface of the grinding wheel, and an axle shaft that provides the above-mentioned first axis of rotation of the dop stick is mounted at its opposite ends on the two arms of a yoke that extends from the base. The working surface of the grinding wheel may be one of the flat faces of the grinding wheel, in which case the axle shaft is at least approximately parallel to the flat surface. It is contemplated, however, that the selected working surface will be the cylindrical outer circumferential surface of the grinding wheel and that the axle shaft of the device that provides the first axis of rotation of the dop stick will be at least approximately parallel with the axis of rotation of the grinding wheel.

A holder for the dop stick is rotatably mounted on the axle shaft and extends forward therefrom for manual oscillation about the axis shaft by the operator of the device. The dop stick itself is in turn pivotally mounted on the pivoted holder by a pin that provides the second axis of rotation, the pin being spaced towards the cabachon from the axle shaft and being perpendicular to the plane of the axle shaft. For the purpose of adjustment of the radius of transverse curvature of the face of the cabachon, the dop stick has a series of longitudinally spaced diametrical bores for selectively receiving the pivot pin. The oval cabachon that is adhesively mounted on the outer end of the dop stick is oriented with its transverse center line in the same plane as the axle shaft and with its longitudinal center line in the same plane as the pivot pin.

A further object of the invention is to distribute the wear across an ample area of the grinding wheel during the grinding of the cabachon. Thus, if the outer circumferential surface of the grinding stone is used, the object is to distribute the wear over the full width of that surface to preserve the uniformity and smoothness of the grinding surface. For this purpose the dop stick holder is slidable along the length of the axle shaft that provides the first axis of rotation of the dop stick. The permitted range of movement of the holder along the axle shaft is at least as great as the width of the working surface of the grinding wheel.

A feature of the preferred embodiment of the device is the concept of mounting the yoke on the base of the device for rearward retraction against spring pressure from a normal advanced operating position. Normally the spring pressure holds the yoke against a manually adjustable stop nut.

A first important advantage of this arrangement is that the yoke is capable of retracting against spring pressure to prevent structural damage to the cabachon or to the device itself in the event that the dop stick is subjected to a sudden rearward thrust by the grinding wheel. A second important advantage is that with the stop nut adjusted to an intermediate point in its range of adjustment, the dop stick may be advanced toward the grinding wheel by simply loosening the stop nut. With reasonable care, the position of the base relative to the grinding surface may be so adjusted that the entire grinding operation may be performed without stopping to move the base forward. If it so happens, however, that the cabachon must be advanced slightly to finish the grinding operation, it is a simple matter to loosen the stop nut instead of taking the trouble to shift the base of the device toward the grinding wheel.

The features and advantages of the invention may be understood by reference to the following detailed description and the accompanying drawing.

BRIEF DESCRIPTION OF THE DRAWING

In the drawing, which is to be regarded as merely illustrative.

DESCRIPTION OF THE PREFERRED EMBODIMENTS OF THE INVENTION

Figure 1:
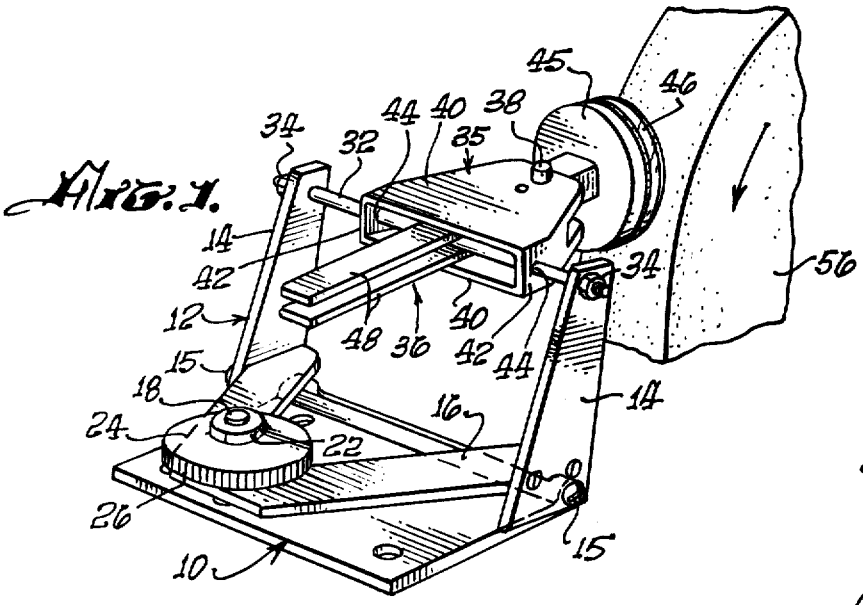
FIG. 1 is a perspective view of the presently preferred embodiment of the invention.

Referring to the drawing, a base structure for the device comprises a base plate 10 and a support in the form of a yoke, generally designated 12, which has a pair of upright arms 14 and is hingedly mounted on the base plate by a pair of pivots 15. The two arms 14 are rigidly interconnected by a forwardly extending V-shaped plate 16 for the purpose of controlling the angular position of the yoke relative to the base plate.

A screw 18 extends rigidly upward from the base plate 10 through an aperture 20 of the V-shaped plate 16 and at its upper end is screwthreadedly engaged by a nut 22. The nut 22 serves as an adjustable stop nut and is manually adjustable by a knob 24 that is united with the nut and has a hub 25 that slidingly embraces the screw. The rim of the knob 24 is knurled as indicated at 26 to facilitate manual manipulation. A washer 28 is interposed between the hub 25 and the V-shaped plate 16, and a suitable coiled spring 30 surrounds the screw 18 under compression between the base plate 10 and the V-shaped plate 16. Thus, the spring 30 urges the yoke 12 rearwardly about the common axis of the two pivots 15, the nut 22 serving as adjustable stop means that determines the limit position of the yoke.

An axle shaft 32 mounted at its opposite ends on the yoke arms 14 and secured by end nuts 34 pivotally carries a holder 35 for a dop stick 36, and the dop stick is pivotally mounted on the holder 35 by a removable pivot pin 38. The axle shaft 32 provides the previously mentioned first axis of rotation about which the dop stick may be manually oscillated, and the pivot pin 38 provides the second axis of rotation about which the dop stick may be manipulated.

The holder 35 which extends forwardly from the axle shaft 32 may be a hollow member comprising upper and lower plates 40, which are spaced apart and are interconnected by opposite side members 42 which have bores 44 to receive the axle shaft.

The forward end of the dop stick 36 has a head of oval plan configuration 45 on which a work piece or unfinished cabachon 46 of the same plan configuration is adhesively mounted. The rear end of the dop stick extends rearwardly from the holder 35 to provide a handle 48 for manual oscillation of the dop stick about its two independent axes of rotation. The dop stick 36 intersects the axle shaft 32 and therefore is formed with a longitudinal slot 49 that straddles the axle shaft.

Figure 4:
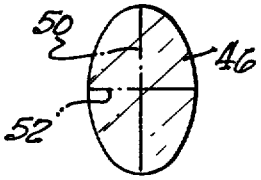
FIG. 4 is a diagram showing the oval plan configuration of a cabachon with the plan configuration bisected by a longitudinal center line and by a transverse center line.

As shown in FIG. 4, the oval plan configuration of the head 45 and of the cabachon 46 has a longitudinal center line 50 and a transverse center line 52 that is perpendicular to the longitudinal center line. The axle shaft 32 that provides the first axis of rotation is in the same plane as the transverse center line 52 of the oval plan configuration, and the pivot pin 38 is in the same plane as the longitudinal center line 50 of the oval plan configuration.

It is contemplated that suitable adjustment will be provided for varying the distances of the two axes of rotation from the cabachon 46. For example, the pivot pin 38 may be adjustable longitudinally of the dop stick 36 and/or may be adjustable along the holder 35. In this instance the dop stick 36 has a series of diametrical bores 54 spaced longitudinally thereof for selective occupancy by the pivot pin 38, and the upper and lower plates 40 of the holder 35 have spaced bores 55 for the pivot pin.

The cabachon 46 may be applied either to a side surface or to a peripheral surface of a power-actuated grinding wheel 56, but in this instance the base structure of the device is suitably positioned for application of the cabachon to the cylindrical outer circumferential surface of the grinding wheel. In practice, the base plate 10 of the apparatus may be clamped to rigid support structure (not shown) by a suitable C-clamp (not shown).

Figure 5:
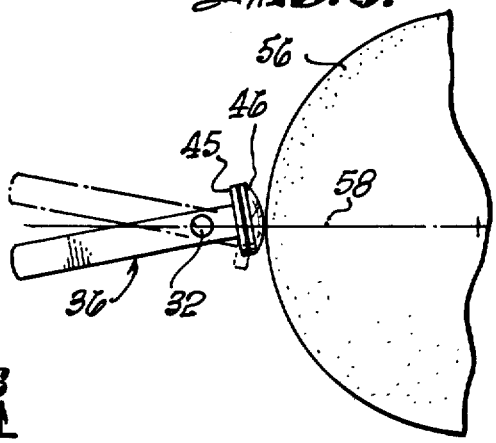
FIG. 5 is a diagrammatic view to explain how a grinding wheel may subject a dop stick to a sudden severe thrust.
Figure 2:
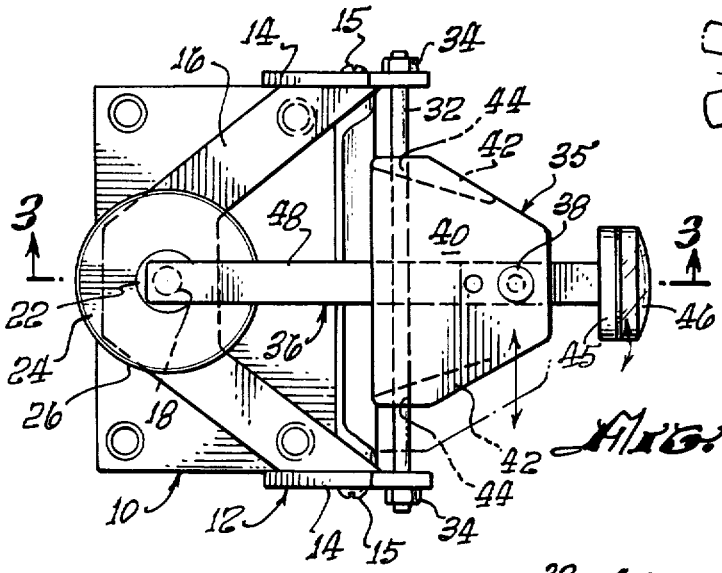
FIG. 2 is a plan view of the embodiment.
Figure 3:
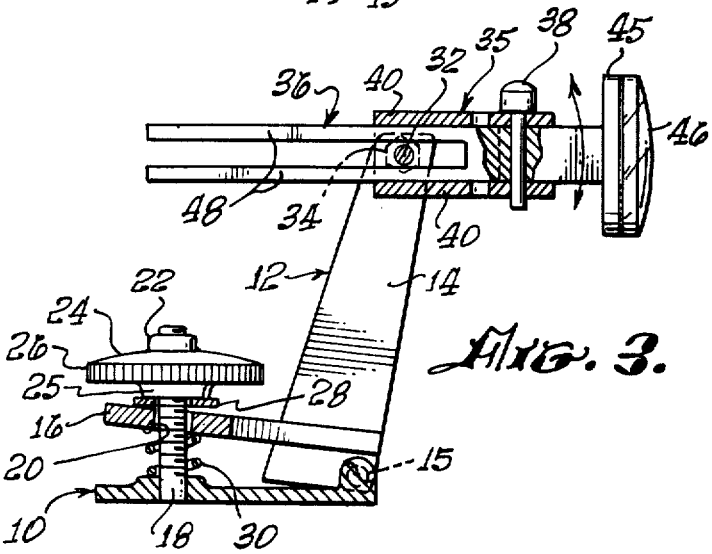
FIG. 3 is a section along line 3—3 of FIG. 2.

Under certain circumstances, the grinding wheel 56 may possibly subject the dop stick 36 to a sudden thrust that might damage the device. This fact may be understood by referring to FIG. 5, where the cabachon 46 is applied to the periphery of a grinding wheel 56 at a point above the level of a dotted line 58 that is defined by the axis of rotation of the grinding wheel and the axle shaft 32 of the device. With the grinding wheel 56 rotating counterclockwise, as indicated by the arrow, there is a possibility that the cabachon may be frictionally engaged by the traveling peripheral surface of the grinding wheel and thereby be suddenly shifted from the upper position shown in dotted lines in FIG. 5 to the lower solid line position. As the downwardly moving cabachon passes through the dotted line 58, the dop stick is subjected to a severe thrust. One important function of the coiled spring 30 is to absorb such a thrust and thus avoid structural damage to the device.

A second important function of the described arrangement for yieldingly mounting the yoke 12 on the base plate 10 is to permit minor adjustments in the spacing of the axle shaft 32 from the grinding wheel without the necessity of shifting the clamped base plate 10. For this purpose, the stop nut 22 is adjusted at an intermediate point in the range of expansion and compression of the coiled spring 30, there being ample allowance for yielding to a sudden thrust on the dop stick. With reasonable care, the base plate 10 may be initially clamped at a position that permits the whole grinding operation to be carried out without the necessity of advancing the axle shaft 32 towards the grinding wheel, but in the event that a slight advance is required for completion of the grinding operation, the slight advance may be made by merely loosening the stop nut 22.

It is to be noted that the width of the holder 35 measured along the length of the axle shaft 32 is substantially less than the effective length of the axle shaft to give the holder freedom for a certain range of sliding movement along the axle shaft. This range of movement is at least equal to the width of the outer circumferential surface of the grinding wheel 56 and preferably is somewhat greater. This range of sliding movement of the holder along the axle shaft permits the operator to distribute the wear over the full width of the outer circumferential surface of the grinding wheel.

The manner in which the device serves its purpose may be readily understood from the foregoing description. For guidance in spacing the base plate 10 from the grinding wheel 56, the dop stick may be swung sidewise to a position for initial grinding action against one side edge of the cabachon. With the cabachon so positioned and touching the grinding wheel near one edge of the grinding wheel, it is a simple matter to adjust the position of the base plate 10 for carrying out the grinding operation. In the recommended procedure, the operator grasps the holder 35 with one hand and grasps the handle 48 of the dop stick 36 with the other hand. The holder 35 may be continually oscillated about the axle shaft 32 and may also be shifted along the axle shaft at the same time for the purpose of distributing the wear on the grinding wheel. The handle 48 of the dop stick may be simultaneously oscillated about the pivot pin 38. Since the dop stick is independently rotatable both about the axle shaft 32 and about the pivot pin 38, the handle of the dop stick may, if desired, be manually rotated in a circular orbit. The operator may continually shift the cabachon over the grinding surface at random with complete assurance that the movement of the cabachon will be accurately guided at all times for the desired final longitudinal curvature and transverse curvature of the convex face of the cabachon.

My description in specific detail of the presently preferred embodiment of the invention will suggest various changes, substitutions, and other departures from may disclosure within the spirit and scope of the appended claims.

I claim:

1. In a device to facilitate the grinding of the face of a cabochon of generally elliptical plan configuration to a curved convex configuration by a grinding wheel, the combination of:

a dop stick to hold an unfinished cabochon on one of its ends;

a holder for the dop stick;

a base structure;

first pivot means on the base structure pivotally supporting the holder for manual oscillation thereof about a first axis of rotation in the plane of the transverse center line of the plan configuration of the cabochon; and second pivot means on the holder pivotally supporting the dop stick for manual oscillation relative to the holder about a second axis of rotation in the plane of the longitudinal center line of the plan configuration of the cabochon;

the distance of the first pivot means from the desired convex face of the cabochon being substantially equal to the desired radius of longitudinal curvature of the convex face of the cabochon, the second pivot means being located between the cabochon and the first pivot means, the distance of the second pivot means from the desired convex face of the cabochon being substantially equal to the desired radius of transverse curvature of the convex face of the cabochon;

whereby, when said device is positioned for use and the face of an unfinished cabochon on said dop stick is brought into proper grinding contact with said grinding wheel, the holder and dop stick are simultaneously movable about the above-mentioned first and second axes of rotation so that said face can be smoothly ground to said curved convex configuration;

said base structure including a normally fixed base and a support carrying the first pivot means;

the support being pivotally mounted on the base and having a normal forward limit position;

said base structure also including means yieldingly urging the support towards its limit position and permitting retraction of the support from its limit position to avoid damage to the device in the event the rotary grinding wheel exerts a sudden thrust against the cabochon.

2. A combination as set forth in claim 1, which includes spring means acting between the base and the support to urge the support forwardly; and which includes adjustable screw-threaded means to block the forward movement of the support and thereby determine and forward limit position of the support.

3. In a device to facilitate the grinding of the face of a cabochon of generally elliptical plan configuration to a curved convex configuration by a grinding wheel, the combination of:

a dop stick to hold an unfinished cabochon on one of its ends;

a holder for the dop stick;

a base structure;

first pivot means on the base structure pivotally supporting the holder for manual oscillation thereof about a first axis of rotation in the plane of the transverse center line of the plan configuration of the cabochon; and second pivot means on the holder pivotally supporting the dop stick for manual oscillation relative to the holder about a second axis of rotation in the plane of the longitudinal center line of the plan configuration of the cabochon;

the distance of the pivot means from the desired convex face of the cabochon being substantially equal to the desired radius of longitudinal curvature of the convex face of the cabochon, the second pivot means being located between the cabochon and the first pivot means, the distance of the second pivot means from the desired convex face of the cabochon being substantially equal to the desired radius of transverse curvature of the convex face of the cabochon;

whereby, when said device is positioned for use and the face of an unfinished cabochon on said dop stick is brought into proper grinding contact with said grinding wheel, the holder and dop stick are simultaneously movable about the above-mentioned first and second axes of rotation so that said face can be smoothly ground to said curved convex configuration;

the second end of said dop stick extending rearwardly from the holder to serve as a handle for manipulation of the dop stick, and said dop stick having a longitudinal slot to straddle the first pivot means.

*4. In a device to facilitate the grinding of the face of a cabochon of generally elliptical plan configuration to a*

*curved convex configuration by a grinding wheel, the combination of:*

*a base structure including a normally fixed base member and a support member,*

*the support member being connected to the base member for pivotal movement of the support member relative to the base member in forwardly and rearwardly directions respectively toward and away from a grinding wheel,*

*the support member having an adjustable forward limit position;*

*a dop stick having a head at one end for holding an unfinished cabochon for grinding;*

*a holder for the dop stick;*

*first pivot means pivotally supporting the holder relative to the support member;*

*second pivot means pivotally supporting the dop stick relative to the holder;*

*one of the pivot means providing for unconstrained manual oscillation of the dop stick only about a first axis of rotation transversely of the dop stick and in the plane of the transverse center line of the plan configuration of a cabochon, and*

*the other of the pivot means providing for unconstrained manual oscillation of the dop stick only about a second axis of rotation transversely of the dop stick and in the plane of the longitudinal center line of the plan configuration of a cabochon simultaneously with oscillation of the dop stick about said first axis, said second axis being located between the dop stick head and said first axis;*

*the distance of said first axis from the dop stick head providing the desired radius of longitudinal curvature of the face of the cabochon, and*

*the distance of said second axis from the dop stick head providing the desired radius of transverse curvature of the convex face of the cabochon;*

*means for adjusting the distance between the dop stick head and at least one of said axes; and*

*means yieldingly urging the support member toward said limit position and permitting retraction of the support member from said limit position to avoid damage in the event a grinding wheel should exert a sudden rearward thrust upon a cabochon on the dop stick head.*

* * * * *